United States Patent
Mo et al.

(10) Patent No.: US 12,504,143 B2
(45) Date of Patent: Dec. 23, 2025

(54) LIGHT GUIDE ELEMENT, LIGHTING DEVICE AND VEHICLE

(71) Applicant: VALEO VISION, Bobigny (FR)

(72) Inventors: Xihui Mo, Foshan (CN); Zhilin Su, Foshan (CN); Junlun Dong, Foshan (CN)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/712,095

(22) PCT Filed: Dec. 7, 2022

(86) PCT No.: PCT/EP2022/084881
§ 371 (c)(1),
(2) Date: May 21, 2024

(87) PCT Pub. No.: WO2023/104936
PCT Pub. Date: Jun. 15, 2023

(65) Prior Publication Data
US 2025/0020303 A1    Jan. 16, 2025

(30) Foreign Application Priority Data
Dec. 8, 2021 (CN) .......................... 202123073372.1

(51) Int. Cl.
*F21S 43/241*    (2018.01)
*F21S 43/242*    (2018.01)
(Continued)

(52) U.S. Cl.
CPC ........... *F21S 43/241* (2018.01); *F21S 43/243* (2018.01); *F21S 43/246* (2024.05); *F21S 43/31* (2018.01); *F21S 43/50* (2018.01)

(58) Field of Classification Search
CPC ........ F21S 43/246; F21S 43/31; F21S 43/243; F21S 43/50; F21S 43/241
See application file for complete search history.

(56) References Cited

U.S. PATENT DOCUMENTS 6,097,549 A * 8/2000 Jenkins .................. F21S 43/14
362/520
8,485,704 B2 * 7/2013 Koizumi ............... F21S 43/239
362/555
(Continued)

FOREIGN PATENT DOCUMENTS

EP      416 220 A1    5/2004
FR    3 074 879 A1    6/2019
(Continued)

OTHER PUBLICATIONS

International Search Report Issued Mar. 13, 2023, in PCT/EP2022/084881, filed on Dec. 7, 2022, citing documents 1-3 & 15-17 therein, 4 pages.

*Primary Examiner* — Zheng Song
(74) *Attorney, Agent, or Firm* — Oblon, McClelland, Maier & Neustadt, L.L.P.

(57) ABSTRACT

A light guide element including at least one light guide unit, each light guide unit having at least one first light entry part, at least one first reflecting part, a second reflecting part and a first light exit part. The second reflecting part and the first light exit part are disposed in a peripheral region of the light guide unit. The first light entry part receives light rays from a light source; the first reflecting part reflects light rays from the first light entry part towards the second reflecting part in the peripheral region. The second reflecting part reflects light rays from the first reflecting part towards the first light exit part, such that the light rays emerge from the first light exit part. A lighting device and a vehicle may implement the light guide.

20 Claims, 5 Drawing Sheets

(51) Int. Cl.
    *F21S 43/243*     (2018.01)
    *F21S 43/31*     (2018.01)
    *F21S 43/50*     (2018.01)

(56) References Cited

U.S. PATENT DOCUMENTS

| | | |
|---|---|---|
| 2004/0141323 A1 | 7/2004 | Aynie et al. |
| 2010/0053959 A1 | 3/2010 | Ijzerman et al. |
| 2016/0040847 A1 | 2/2016 | Ikuta et al. |
| 2019/0001878 A1* | 1/2019 | Schneider ............ G09F 21/049 |
| 2021/0278056 A1* | 9/2021 | Gloss ................ F21S 43/14 |
| 2022/0090753 A1* | 3/2022 | Kang ................ F21S 41/25 |
| 2024/0200751 A1* | 6/2024 | Kim ................ F21S 43/241 |

FOREIGN PATENT DOCUMENTS

| | | | | |
|---|---|---|---|---|
| JP | 2007123175 A | * | 5/2007 | ............ F21S 43/245 |
| JP | 2016181372 A | * | 10/2016 | |
| WO | WO 2008/126023 A2 | | 10/2008 | |

* cited by examiner

LIGHT GUIDE ELEMENT, LIGHTING DEVICE AND VEHICLE

TECHNICAL FIELD

The present invention relates to the technical field of vehicle lamps, in particular to a light guide element, a lighting device and a vehicle.

BACKGROUND ART

Lighting devices are indispensable components in lighting and/or optical signal indicating devices of all kinds, being used to provide light for lighting and/or optical indication, and widely applied in various fields; for example, lighting devices such as vehicle lamps are used in motor vehicles to ensure safe travel. In motor vehicles, various types of vehicle lamps are often required to achieve different functions, including motor vehicle headlights, daytime running lights, turn signals, tail lights, brake lights, side marker lights and so on.

In recent years, original equipment manufacturers have been placing higher demands on vehicle lamps in terms of functionality. While ensuring normal lighting and/or optical indication functions, it is also hoped that motor vehicle appearance can be improved—for example, a logo lamp is mounted at the front and/or rear of the vehicle, to illuminate the logo of the original equipment manufacturer. However, logo lamps in the prior art are generally realized using a large number of LED, so the cost is high and the illumination effect is not sufficiently uniform.

SUMMARY OF THE INVENTION

Thus, an objective of the present invention is to propose a light guide element, a lighting device and a vehicle, which can at least partially solve the abovementioned problem.

According to one aspect of the present invention, a light guide element is provided, comprising at least one light guide unit, each light guide unit comprising at least one first light entry part, at least one first reflecting part, a second reflecting part and a first light exit part, wherein the second reflecting part and the first light exit part are disposed in a peripheral region of the light guide unit, and:
- the first light entry part receives light rays from a light source;
- the first reflecting part reflects light rays from the first light entry part towards the second reflecting part in the peripheral region;
- the second reflecting part reflects light rays from the first reflecting part towards the first light exit part, such that the light rays emerge from the first light exit part.

According to the embodiments of the present invention, the use of the light guide element makes it possible to achieve an illuminated appearance having a specific geometric patterning at a low cost with fewer light sources. For example, because the first light exit part is disposed in the peripheral region of the light guide unit, the required geometric patterning can be obtained by setting the shape of the light exit part.

In one embodiment, the first reflecting part has a substantially conical cross section; preferably, the shapes of the first reflecting part and the first light entry part cooperate with each other to collimate light rays from the light source. Thus, light rays from the light source become substantially parallel light rays under the cooperative action of the first light entry part and the first reflecting part, helping to improve optical efficiency and the uniformity of the illumination effect.

In one embodiment, the first light exit part forms a closed geometric patterning.

In one embodiment, the at least one light guide unit comprises a first light guide unit and a second light guide unit, and at least parts of the first light exit parts of the first light guide unit and the second light guide unit are joined together, to form the required geometric patterning.

According to the embodiments of the present invention, a richer illuminated appearance can be achieved by joining together different light guide units.

In one embodiment, a scattering mechanism is provided on the second reflecting part of the first light guide unit and/or the second light guide unit, to scatter light rays that will emerge from the joined parts of the first light exit parts of the first light guide unit and/or the second light guide unit; in this way, the uniformity of the illumination effect is increased.

In one embodiment, the first light guide unit and the second light guide unit are an integrally formed member; in this way, the process can be simplified.

In one embodiment, the light guide unit further comprises at least one second light entry part and at least one second light exit part; the second light exit part is disposed opposite the second light entry part, to output light rays from the second light entry part.

According to the embodiments of the present invention, the second light entry part and second light exit part are additionally provided so that the second light exit part and first light exit part are combined to achieve a richer illuminated appearance.

In one embodiment, the second light exit part and the first light exit part are located at the same side of the light guide element.

In one embodiment, a scattering mechanism is provided on the second light exit part, to scatter light rays emerging from the second light exit part; in this way, the uniformity of the illumination effect is increased.

According to another aspect of the present invention, also provided is a lighting device, comprising:
- a light guide element according to any one of the above embodiments; and
- at least one light source, emitting light towards the light entry part of the light guide element.

According to another aspect of the present invention, also provided is a vehicle comprising the lighting device as described above.

BRIEF DESCRIPTION OF THE DRAWINGS

The above-described characteristics, technical features and advantages of the present invention and modes of implementation thereof will be further explained below in a clear and easy-to-understand manner through a description of preferred embodiments with reference to the drawings, wherein.

DETAILED DESCRIPTION OF EMBODIMENTS

Embodiments of the present invention are described demonstratively below. As those skilled in the art should realize, the embodiments explained may be amended in various ways without departing from the concept of the present invention. Thus, the drawings and description are essentially illustrative, not restrictive. In the following text, identical reference numerals generally denote elements with identical or similar functions.

Figure 1:
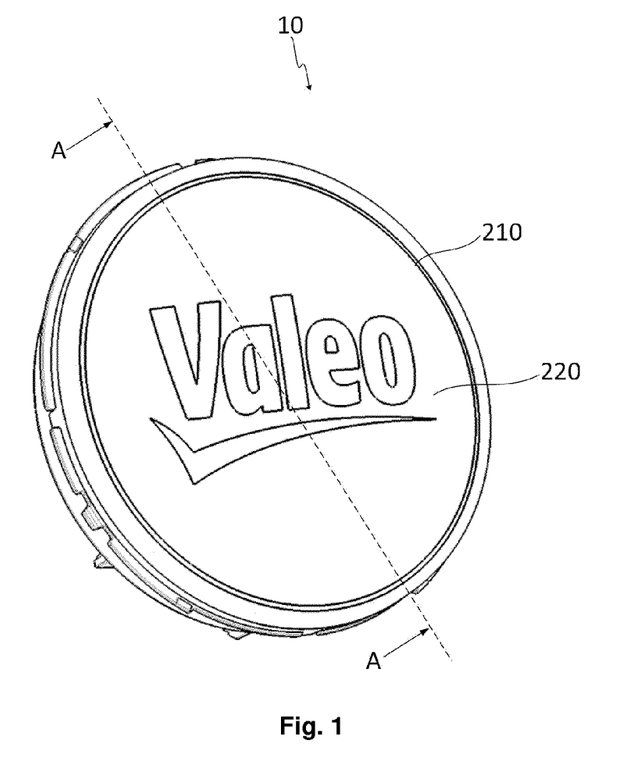
FIG. 1 shows a front view of a lighting device 10 according to an embodiment of the present invention.
Figure 2:
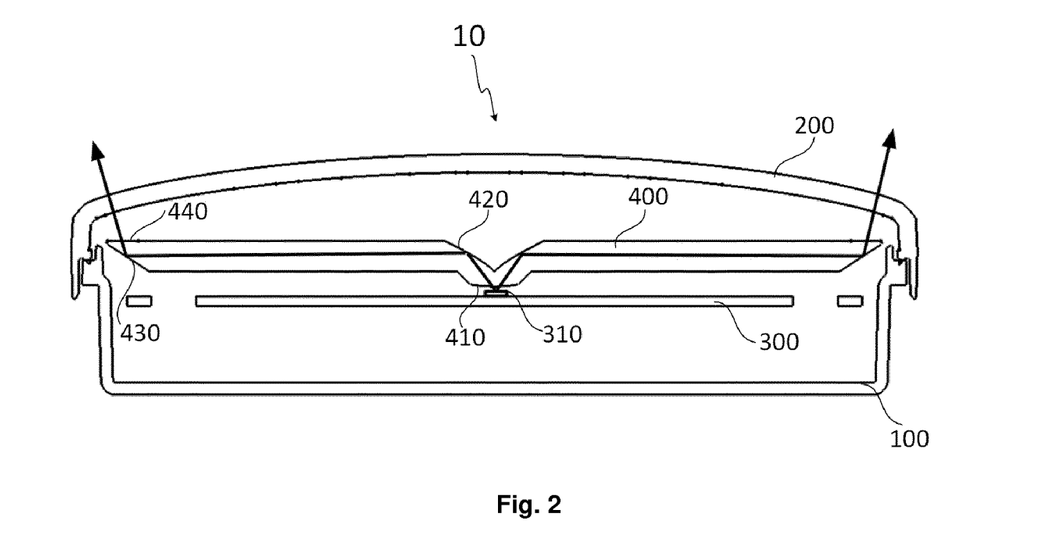
FIG. 2 shows a schematic sectional drawing of the lighting device 10 in FIG. 1 along line A-A.

FIG. 1 shows a front view of a lighting device 10 according to an embodiment of the present invention; FIG. 2 shows a schematic sectional drawing of the lighting device 10 in FIG. 1 along line A-A. As shown in the figures, the lighting device 10 according to an embodiment of the present invention comprises a housing 100, a transparent front cover 200, a printed circuit board 300 and a light guide element 400, wherein the transparent front cover 200 covers the housing 100, and the printed circuit board 300 and light guide element 400 are located in a space enclosed by the housing 100 and the transparent front cover 200. In an embodiment of the present invention, the specific form of the lighting device 100 is not restricted; it may be a logo lamp, but may also be an interior lamp or decorative lamp, etc.

As shown in FIG. 2, a light source 310 is mounted on the printed circuit board 300. The light source is configured to emit light rays towards a light entry part of the light guide element 400, such that the light rays are propagated in the light guide element 400 and emerge from a light exit part thereof. The embodiments of the present invention do not define the type of the light source 310, which may be any suitable type of light source. As shown in FIG. 1, the transparent front cover 200 comprises a light-permeable region 210. The figure shows the light-permeable region 210 in the form of a circular ring; light rays from the light exit part of the light guide element 400 go on to emerge through the light-permeable region 210, and an observer can thus observe an illuminated appearance in the form of a circular ring. It will be understood that the transparent front cover 200 may also have a light-permeable region 210 of another shape. Preferably, the transparent front cover 200 may further comprise a light-impermeable region 220, for example but not limited to a light-impermeable decorative coating, such that the light-permeable region 210 has a more obvious boundary, and the illuminated appearance is more aesthetically pleasing. Furthermore, the light-impermeable region 220 of the transparent front cover 200 may further comprise another pattern, for example but not limited to the "Valeo" trademark shown in FIG. 2.

Figure 3A:
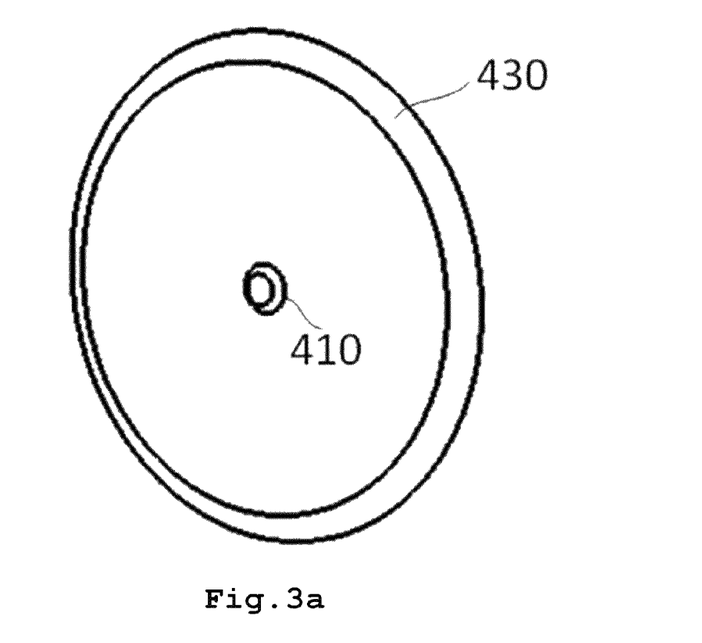
FIG. 3a shows a rear view of a light guide element 400 according to an embodiment of the present invention.
Figure 3B:
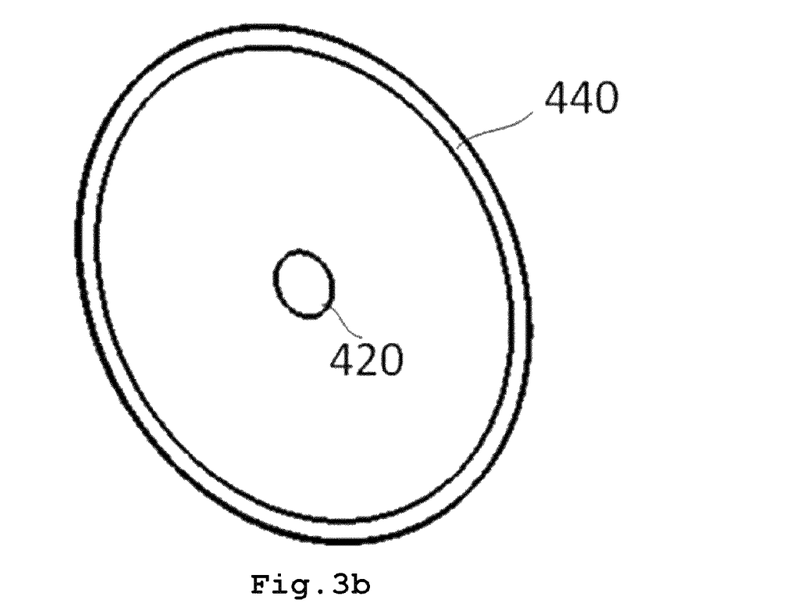
FIG. 3b shows a front view of the light guide element 400 according to an embodiment of the present invention.

FIG. 3a shows a rear view of the light guide element 400 according to an embodiment of the present invention; FIG. 3b shows a front view of the light guide element 400 according to an embodiment of the present invention. As shown in FIGS. 2, 3a and 3b, the light guide element 400 serves as a light guide unit overall, is substantially in the form of a round plate, and specifically comprises a first light entry part 410, a first reflecting part 420, a second reflecting part 430 and a first light exit part 440. The first light entry part 410 and first reflecting part 420 are located substantially at the centre of the round plate of the light guide element 400. The first light entry part 410 is used to receive light rays from the light source 310 and guide them towards the first reflecting part 420. The first reflecting part 420 is opposite the first light entry part 410, and receives and reflects light rays from the first light entry part 410. The second reflecting part 430 and first light exit part 440 are both located in a peripheral region of the light guide element 400. The first reflecting part 420 can reflect light rays to the second reflecting part 420 in all radial directions, and the second reflecting part 420 then reflects the light rays towards the first light exit part 440, such that the light rays finally emerge from the first light exit part 440 to form a specific illuminated appearance. Thus, an illuminated appearance having the required pattern can be obtained by setting the shape of the first light exit part 440 located in the peripheral region.

In one example, as shown in FIGS. 2 and 3b, the light guide element 400 has a depression at the centre of the round plate. A surface of the depression forms the first reflecting part 420, so the first reflecting part 420 can reflect light rays in all radial directions. Specifically, the first reflecting part 420 has a substantially conical cross section. Preferably, to increase the formation of a collimating part by the first light entry part 410 and first reflecting part 420, with light rays from the light source 310 becoming substantially parallel light rays under the action of the collimating part, the specific shapes of the first light entry part 410 and first reflecting part 420 may specifically be designed such that the first light entry part 410 and first reflecting part 420 cooperate with each other to collimate light rays from the light source 310. For example but without limitation, the first light entry part 410 may have a planar shape (such that the cross section in FIG. 2 has a linear part), and the first reflecting part 420 may have a convex shape (such that the conical cross section in FIG. 2 has a paraboloid part), or the first light entry part 410 and first reflecting part 420 both have a convex shape (such that the cross section in FIG. 2 has a paraboloid part).

In one example, the second reflecting part 430, the first light exit part 440 and the light-permeable region 210 of the transparent front cover 200 have corresponding shapes. For example, as shown in FIG. 3a, the second reflecting part 430 is formed in the shape of a circular ring in an edge region of the light guide element 400. Specifically, the second reflecting part 430 may be formed as a side surface of the round plate, in the form of an inclined face. Substantially parallel light rays from the first reflecting part 420 are reflected by the second reflecting part 430, after which they emerge from the first light exit part 440 while remaining substantially parallel. In this way, the uniformity of the illumination effect and the optical efficiency can be increased. Corresponding to the second reflecting part 430, the first light exit part 440 is also formed in the shape of a circular ring in an edge region of the light guide element 400. Specifically, the first light exit part 440 may be formed on an upper surface of the round plate, for example as part of the upper surface, or protruding from the upper surface of the round plate.

In one example, to increase the optical efficiency, at least one of the first reflecting part 420 and the second reflecting part 410 has a totally reflecting surface.

It will be understood that the light guide element 400 is not limited to being in the shape of a round plate, but may also have another shape. Correspondingly, the second reflecting part 430, the first light exit part 440 and the light-permeable region 210 of the transparent front cover 200 may also have another closed geometric shape, for example but without limitation, an elliptical, rectangular, square or hexagonal shape, etc. In addition, the positions of the first reflecting part 420 and first light entry part 410 are not limited to the centre of the light guide element 400, and the quantities of the first reflecting part 420 and first light entry part 410 may also be more than one.

According to the embodiments of the present invention, the use of the light guide element 400 makes it possible to achieve an illuminated appearance having a specific geometric shape with fewer light sources 310, so the cost is lower, and at the same time the uniformity of the illumination effect can be ensured.

Figure 4:
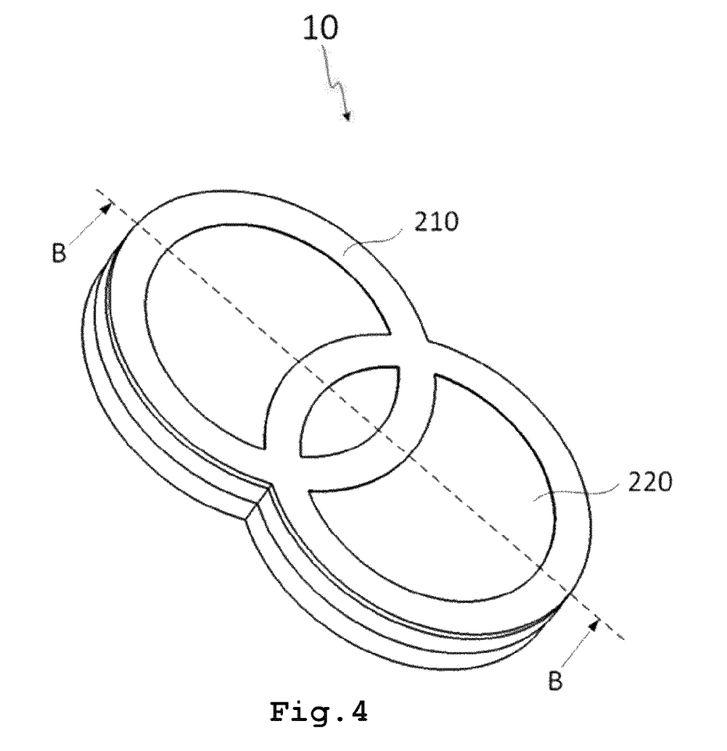
FIG. 4 shows a front view of a lighting device 10 according to another embodiment of the present invention.
Figure 5:
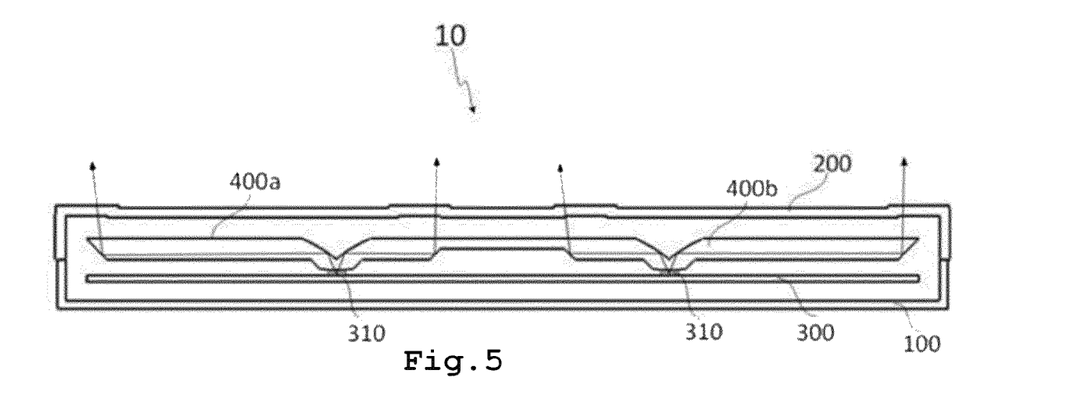
FIG. 5 shows a schematic sectional drawing of the lighting device 10 in FIG. 4 along line B-B.
Figure 6A:
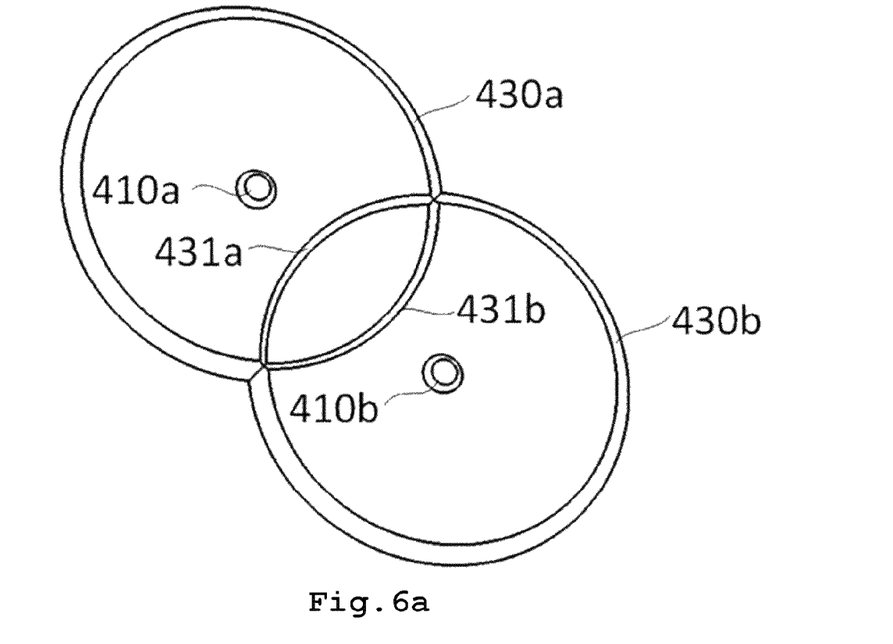
FIG. 6a shows a rear view of a light guide element 400 according to another embodiment of the present invention.
Figure 6B:
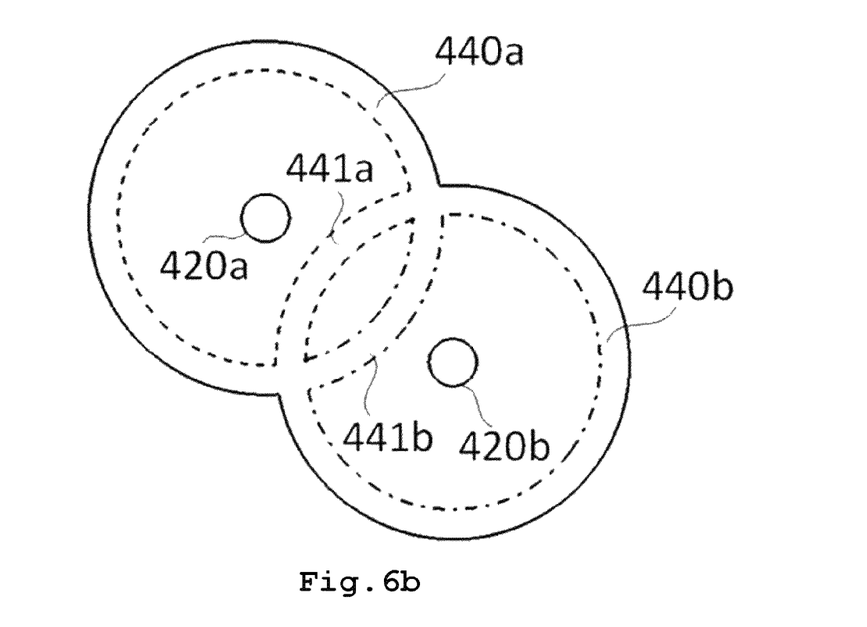
FIG. 6b shows a front view of the light guide element 400 according to another embodiment of the present invention.

FIG. 4 shows a front view of a lighting device 10 according to another embodiment of the present invention; FIG. 5 shows a schematic sectional drawing of the lighting device 10 in FIG. 4 along line B-B; FIG. 6a shows a rear view of the light guide element 400 according to another embodiment of the present invention; and FIG. 6b shows a front view of the light guide element 400 according to another embodiment of the present invention. The lighting device 10 in the embodiments shown in FIGS. 4-6b and the lighting device 10 in the embodiments shown in FIGS. 1-3b differ in the transparent front cover 200 and the light guide element 400, which shall be the focus of the following description; other features which are the same in both lighting devices will not be described again.

As shown in FIGS. 4-6b, the light guide element 400 comprises a first light guide unit 400a and a second light guide unit 400b, wherein the first light guide unit 400a comprises a first light entry part 410a thereof, a first reflecting part 420a thereof, a second reflecting part 430a thereof and a first light exit part 440a thereof, and the second light guide unit 400b comprises a first light entry part 410b thereof, a first reflecting part 420b thereof, a second reflecting part 430b thereof and a first light exit part 440b thereof. The structure of each light guide unit is the same as the structure of the light guide unit 400 shown in FIGS. 1-3b, so the corresponding descriptions above may be referred to for information about each component. The difference is that the first light exit part and second reflecting part of the first light guide unit 400a and second light guide unit 400b are not in the shape of a standard circular ring, but each have a gap; as shown in FIG. 6b, the first light exit part 440a (indicated by the dashed line) of the first light guide unit 400a and the first light exit part 440b (indicated by the dotted-dashed line) of the second light guide unit 400b are joined together to form two partially interlocking circular rings. Specifically, the first light exit part 440a of the first light guide unit 400a has a first joining part 441a, the first light exit part 440b of the second light guide unit 400b has a second joining part 441b, and the two joining parts are joined together at both ends. As shown in FIG. 6b, corresponding to the first light exit part 440a and the first light exit part 440b of the second light guide unit 400bd, the second reflecting part 430a of the first light guide unit 400a and the second reflecting part 430b of the second light guide unit 400b are also joined together to form two partially interlocking circular rings. Specifically, the second reflecting part 430a of the first light guide unit 400a has a third joining part 431a, the second reflecting part 430b of the second light guide unit 400b has a fourth joining part 431b, and the two joining parts are joined together at both ends. The third joining part 431a and fourth joining part 431b are closer to the first reflecting part than other parts are; thus, to ensure the uniformity of the illumination effect, the third joining part 431a and fourth joining part 431b may have a scattering mechanism, for example but not limited to sawteeth or optical protrusions, etc., to scatter the light rays that will emerge from the joining parts.

As shown in FIG. 4, corresponding to the first light exit parts of the first light guide unit 400a and second light guide unit 400b, the light-permeable region 210 of the transparent front cover 200 also has two partially interlocking annular shapes.

Preferably, to simplify the process, the first light guide unit 400a and second light guide unit 400b may be an integrally formed element.

It will be understood that the shapes of the first light guide unit 400a and second light guide unit 400b are not limited to this; each of them may have another closed geometric shape, but their first light exit parts may be at least partially joined together, to achieve an illuminated appearance having a specific geometric patterning. In addition, the number of light guide units included in the light guide element 400 is not limited to two, but may be a plurality; and at least two of the plurality of light guide units may be joined together as shown in the embodiment described above.

According to the embodiments of the present invention, a richer illuminated appearance can be achieved by joining together different light guide units.

Figure 7:
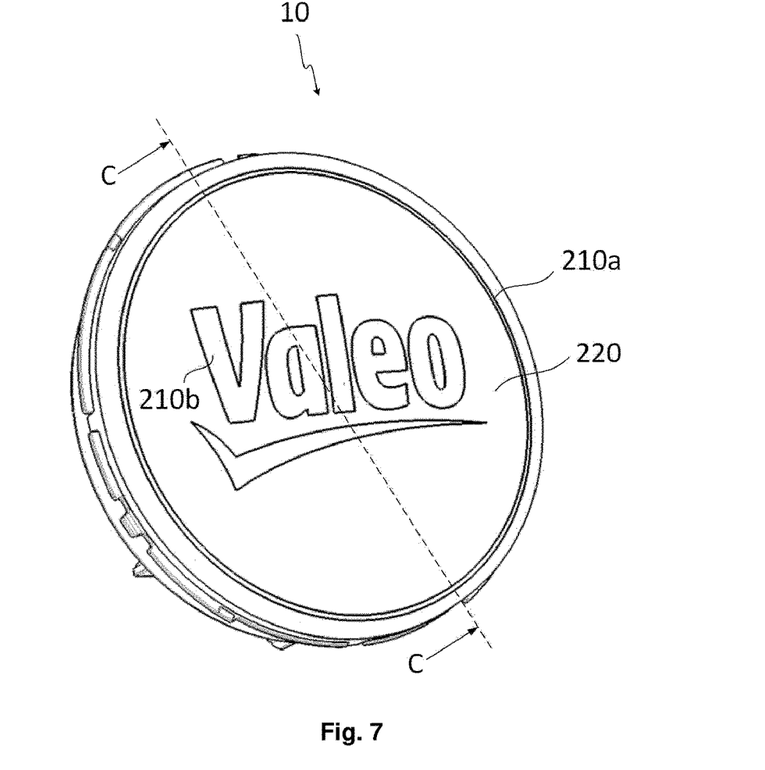
FIG. 7 shows a front view of a lighting device 10 according to another embodiment of the present invention.
Figure 8:
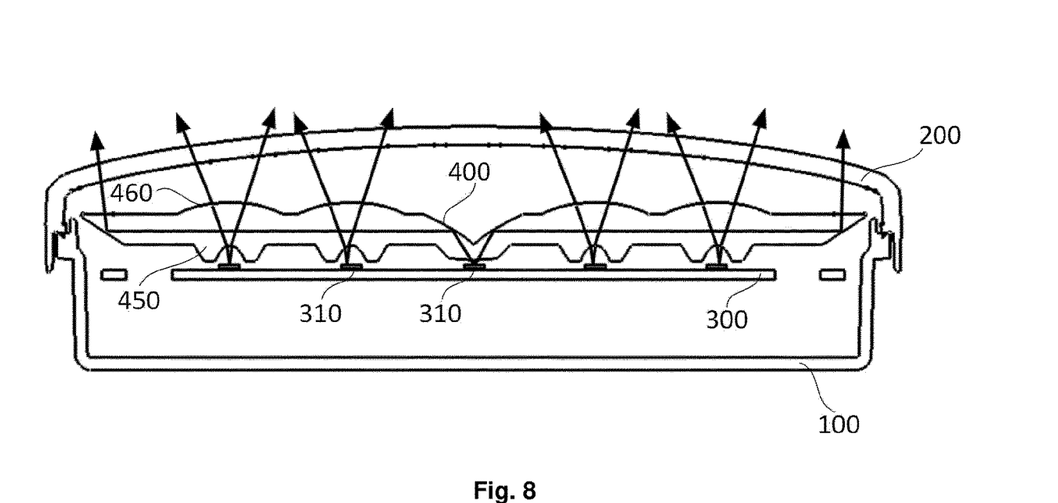
FIG. 8 shows a schematic sectional drawing of the lighting device 10 in FIG. 7 along line C-C.

FIG. 7 shows a front view of a lighting device 1 according to another embodiment of the present invention; FIG. 8 shows a schematic sectional drawing of the lighting device 10 in FIG. 7 along line C-C. The lighting device 10 in the embodiments shown in FIGS. 7 and 8 and the lighting device 10 in the embodiments shown in FIGS. 1-3b differ in the transparent front cover 200 and the light guide element 400, which shall be the focus of the following description; other features which are the same in both lighting devices will not be described again.

Compared with the light guide element 400 shown in FIG. 2, the light guide element 400 shown in FIG. 8 additionally has at least one second light entry part 450 and at least one second light exit part 460. The second light entry part 450 can receive light rays from the light source 310, and guide the light rays towards the second light exit part 460. In a non-limiting example, the second light entry part 450 and the first light entry part 410 are located at the same side of the light guide unit 400, and light sources 310 corresponding to them may be located on the same printed circuit board 300. The second light exit part 460 is opposite the second light entry part 450, to directly output light rays from the second light entry part 450. In a non-limiting example, the second light exit part 460 and the first light exit part 450 are located at the same side of the light guide unit 400; that is to say, light rays emerging from the second light exit part 460 and the first light exit part 450 together achieve the illumination effect of the light guide element 400. Specifically, the at least one second light exit part 450 may be arranged together to form a specific geometric patterning, which combines with the closed geometric patterning realized by means of the first light exit part 440 to form a specific illuminated appearance.

Preferably, to increase the uniformity of the illumination effect, a scattering mechanism is provided on the second light exit part 460, to scatter light rays emerging from the second light exit part 460.

As shown in FIG. 7, the light-permeable region 210 of the transparent front cover 200 comprises two parts: one part is an annular region 210a corresponding to the first light exit part 440, and the other part is a region 210b corresponding to the second light exit part 460, shown in the figure as a region forming the trademark "Valeo"; that is to say, the second light exit parts 460 are arranged according to the trademark "Valeo". It will be understood that the embodiments of the present invention are not limited to this; the light-permeable regions 210a and 210b of the transparent front cover 200 may also have other shapes or patterns, and the second light exit parts 460 may also be arranged in other shapes or patterns.

According to the embodiments of the present invention, the second light entry part and second light exit part are additionally provided so that the second light exit part and first light exit part are combined to achieve a richer illuminated appearance.

According to the embodiments of the present invention, a vehicle is also included, which comprises the lighting device as described above.

The present invention is not limited to the structure described above; various other variants could also be used. Although the present invention has already been described by means of a limited number of embodiments, those skilled in the art could, drawing benefit from this disclosure, design other embodiments which do not depart from the scope of protection of the present invention disclosed herein. Thus, the scope of protection of the present invention should be defined by the attached claims alone.

The invention claimed is:

1. Lighting device, wherein comprising at least one light guide unit and a transparent light cover that covers the at least one light guide unit, each light guide unit comprising at least one first light entry part, at least one first reflecting part, a second reflecting part and a first light exit part, wherein the second reflecting part and the first light exit part are disposed in a peripheral region of the light guide unit, and:
the first light entry part receives light rays from a light source;
the first reflecting part reflects light rays from the first light entry part towards the second reflecting part in the peripheral region;
the second reflecting part reflects light rays from the first reflecting part towards the first light exit part, such that the light rays emerge from the first light exit part; and
the transparent front cover comprises a light-impermeable region and a light-permeable region, the light rays from the light exit part going on to emerge through the light-permeable region.

2. Lighting device according to claim 1, wherein the first reflecting part has a substantially conical cross section.

3. Lighting device according to claim 2, wherein the shapes of the first reflecting part and the first light entry part cooperate with each other to collimate light rays from the light source.

4. Lighting device according to claim 3, wherein the at least one light guide unit comprises a first light guide unit and a second light guide unit, and at least parts of the first light exit parts of the first light guide unit and the second light guide unit are joined together, to form the required geometric patterning.

5. Lighting device according to claim 3, wherein the light guide unit further comprises at least one second light entry part and at least one second light exit part; the second light exit part is disposed opposite the second light entry part, to output light rays from the second light entry part.

6. Lighting device according to claim 3, further comprising:
at least one light source, emitting light towards the light entry part of the light guide element.

7. Lighting device according to claim 2, wherein the at least one light guide unit comprises a first light guide unit and a second light guide unit, and at least parts of the first light exit parts of the first light guide unit and the second light guide unit are joined together, to form the required geometric patterning.

8. Lighting device according to claim 2, wherein the light guide unit further comprises at least one second light entry part and at least one second light exit part; the second light exit part is disposed opposite the second light entry part, to output light rays from the second light entry part.

9. Lighting device according to claim 2, further comprising:
at least one light source, emitting light towards the light entry part of the light guide element.

10. Lighting device according to claim 1, wherein the first light exit part forms a closed geometric patterning.

11. Lighting device according to claim 10, wherein the at least one light guide unit comprises a first light guide unit and a second light guide unit, and at least parts of the first light exit parts of the first light guide unit and the second light guide unit are joined together, to form the required geometric patterning.

12. Lighting device according to claim 1, wherein the at least one light guide unit comprises a first light guide unit and a second light guide unit, and at least parts of the first light exit parts of the first light guide unit and the second light guide unit are joined together, to form the required geometric patterning.

13. Lighting device according to claim 12, wherein the first light guide unit and the second light guide unit are an integrally formed member.

14. Lighting device according to claim 1, wherein the light guide unit further comprises at least one second light entry part and at least one second light exit part; the second light exit part is disposed opposite the second light entry part, to output light rays from the second light entry part.

15. Lighting device according to claim 14, wherein the second light exit part and the first light exit part are located at the same side of the light guide element.

16. Lighting device according to claim 14, wherein the at least one second light exit part forms a specific geometric patterning.

17. Lighting device according to claim 1, further comprising:
at least one light source, emitting light towards the light entry part of the light guide element.

18. Vehicle, wherein comprising the lighting device according to claim 17.

19. Light guide element, comprising at least one light guide unit, each light guide unit comprising at least one first light entry part, at least one first reflecting part, a second reflecting part and a first light exit part, wherein the second reflecting part and the first light exit part are disposed in a peripheral region of the light guide unit, and:
the first light entry part receives light rays from a light source;
the first reflecting part reflects light rays from the first light entry part towards the second reflecting part in the peripheral region;
the second reflecting part reflects light rays from the first reflecting part towards the first light exit part, such that the light rays emerge from the first light exit part;
the at least one light guide unit comprises a first light guide unit and a second light guide unit, and at least parts of the first light exit parts of the first light guide unit and the second light guide unit are joined together, to form the required geometric patterning; and a scattering mechanism is provided on the second reflecting part of the first light guide unit and/or the second light guide unit, to scatter light rays that will emerge from the joined parts of the first light exit parts of the first light guide unit and/or the second light guide unit.

20. Light guide element, comprising at least one light guide unit, each light guide unit comprising at least one first light entry part, at least one first reflecting part, a second reflecting part and a first light exit part, wherein the second reflecting part and the first light exit part are disposed in a peripheral region of the light guide unit, and:

the first light entry part receives light rays from a light source;

the first reflecting part reflects light rays from the first light entry part towards the second reflecting part in the peripheral region;

the second reflecting part reflects light rays from the first reflecting part towards the first light exit part, such that the light rays emerge from the first light exit part;

the light guide unit further comprises at least one second light entry part and at least one second light exit part;

the second light exit part is disposed opposite the second light entry part, to output light rays from the second light entry part; and a scattering mechanism is provided on the second light exit part, to scatter light rays emerging from the second light exit part.

* * * * *